United States Patent [19]

Fujiki et al.

[11] 4,379,114
[45] Apr. 5, 1983

[54] METHOD OF JOINING WATERPROOF SHEETS, AND THEIR JOINT STRUCTURE

[75] Inventors: Toshiaki Fujiki; Hikaru Kano, both of Kobe; Toru Nishi, Nishinomiya, all of Japan

[73] Assignee: Mitsuboshi Belting Limited, Hyogo, Japan

[21] Appl. No.: 309,348

[22] Filed: Oct. 7, 1981

[51] Int. Cl.³ .............. B29C 24/00; B29C 27/00; B29C 15/00
[52] U.S. Cl. .................... 264/248; 156/157; 156/242; 264/261; 264/313; 264/320; 425/DIG. 44
[58] Field of Search ............ 264/248, 259, 261, 313, 264/320; 156/157, 159, 502, 242, 245; 425/DIG. 44

[56] References Cited

U.S. PATENT DOCUMENTS 3,331,719  7/1967  Soloff .................... 156/157
3,770,540  11/1973  Fuchs et al. ............. 156/157

*Primary Examiner*—Willard E. Hoag
*Attorney, Agent, or Firm*—Sughrue, Mion, Zinn, Macpeak & Seas

[57] ABSTRACT

A method of joining narrow waterproof sheets to obtain a waterproof sheet of wide width having a gently curved joint which is free from any acutely stepped portion. It comprises disposing a cure tape between the overlapping edge portions of the sheets to be joined, positioning a piece of cushiony material below or above the overlapping edge portions, and heating the overlapping edge portions and the cure tape under pressure. The cure tape has a width which is substantially equal to that of the overlapping edge portions before pressure is applied thereto. When pressure is applied, the cure tape projects in opposite directions beyond the extremities of the overlapping edge portions. One form of the joint thus formed is flat on one surface and gently curved on the other surface, while another form is gently curved on both surfaces thereof.

8 Claims, 6 Drawing Figures

METHOD OF JOINING WATERPROOF SHEETS, AND THEIR JOINT STRUCTURE

BACKGROUND OF THE INVENTION

1. Field of the Invention

This invention relates to a method of joining waterproof rubber sheets for a reservoir, irrigation pond, pond for disposal of industrial waste, irrigation channel, canal, roof of a house, or the like. More particularly, it is concerned with a method which includes disposing a cure tape between the overlapping edge portions of a pair of vulcanized rubber base sheets having a relatively small width, applying a piece of cushiony material to one of the sheets, and heating the overlapping edge portions under pressure to thereby provide a waterproof sheet of wide width having a joint which is in the form of a gently curved wave in cross section. This invention is also concerned with the construction of any such joint in a waterproof sheet.

2. Description of the Prior Art

Concrete or asphalt has been mainly used for the watertight lining of a reservoir or the like for a long time. Recently, however, rubber sheet, or resin films have come to be widely used for that purpose, since they are higher in flexibility, weatherability, and adaptability to any movement in the base to which they have been applied, easier to apply, and lower in cost.

These rubber sheets or resin films are available in lengths of 200 to 300 m, but the manufacturing facilities restrict their width to usually a range of 1 to 3 m. A multiplicity of sheets having such a small width are transported to the site of construction, and joined together along their edges manually to make a sufficiently large waterproof sheet. There are, however, so many joints to be made that the efficiency of the work is extremely low. As the work is usually done outdoors, it is seriously affected by the weather and environmental conditions. Moisture, water drops and dust have a very adverse effect on the strength of the joints. Nowadays, a reservoir, an irrigation pond, or the like is very large. It is necessary to make unit sheets of wide width available at the site of construction in order to minimize the joints to be made at the site, and shorten the time required for joining the sheets.

A number of methods are known for obtaining unit sheets of wide width. They are, for example, (1) overlapping unvulcanized rubber sheets on each other along their edge portions of predetermined width, and vulcanizing them, (2) overlapping vulcanized rubber sheets on each other along their edge portions, disposing between their overlapping edge portions a cure tape which will be vulcanized under heat and obtain increased strength, and heating their overlapping edge portions and the cure tape therebetween, or (3) overlapping vulcanized sheets on each other along their edge portions of predetermined width, and joining their overlapping edge portions with an adhesive. According to any of these methods, however, the sheets to be joined are overlapped on each other, and there is formed a stepped joint. When waterproof sheets of wide width obtained as hereinabove described are transported to the site of construction, and joined together, the stepped joints in one sheet fail to make tight connection with another sheet, and leave clearances through which water may leak.

The difficulty hereinabove pointed out will be explained more specifically with reference to FIGS. 1 to 3 of the drawings. Narrow sheets 1 and 2 are joined to each other along their overlapping edge portions to provide a sheet of wide width as shown in FIG. 1. This sheet of wide width has a stepped joint. It is joined at the site of construction to another sheet 3 of wide width in a T-shaped pattern as shown in FIG. 2, though they can, of course, be joined in any other pattern, too. A clearance C is formed between the stepped joint and the sheet 3 as shown in FIG. 3, and may cause water leakage therethrough. In order to prevent any such water leakage, it has been usual to apply a sealing material, or unvulcanized tape 4 to the stepped joint before placing the sheet 3 as shown in FIG. 4. This method is, however, very cumbersome. Moreover, it is difficult to apply the sealing material uniformly under the bad conditions prevailing at the site of construction. Water leakage still occurs often, and is the gravest problem in the watertight lining of a reservoir or the like employing waterproof sheets.

SUMMARY OF THE INVENTION

It is an object of this invention to eliminate the drawbacks of the prior art, and provide a method which makes it possible to join waterproof sheets easily and efficiently, and construct a waterproof sheet assembly which is free from any water leakage. It is another object of this invention to provide an improved watertight joint for a waterproof sheet assembly. According to this invention, a cure tape is disposed between the overlapping edge portions of every adjoining pair of narrow vulcanized or unvulcanized rubber sheets, a piece of cushiony material is applied to one of the sheets, and the overlapping edge portions thereof and the cure tape are heated under pressure, whereby there is formed a waterproof sheet of wide width having a gently curved joint which is free from any acutely stepped portion. Such sheets of wide width are joined at the site of construction to provide a waterproof sheet assembly having perfectly watertight joints therein.

DESCRIPTION OF THE PREFERRED EMBODIMENTS

Figure 5:
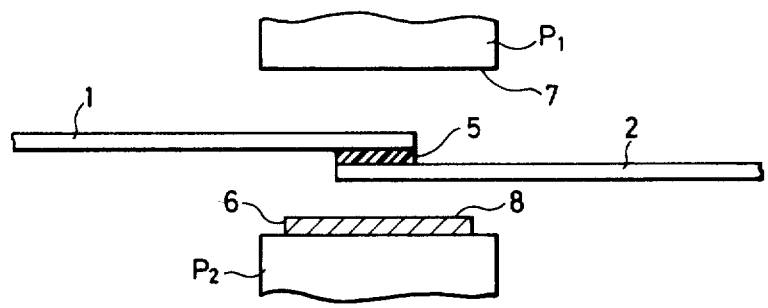
FIG. 5 is a side elevational view illustrating a method of joining a pair of narrow sheets together according to this invention.

Referring first to FIG. 5 of the drawings, there is illustrated a method embodying this invention. A cure tape 5 is disposed between the overlapping edge portions of a pair of vulcanized waterproof sheets 1 and 2. The cure tape 5 has a width which is equal to the overlapping width of the sheets 1 and 2. The overlapping edge portions and the cure tape 5 disposed therebetween are positioned between upper and lower press members $P_1$ and $P_2$. A piece of cushiony material 6 is placed on the lower press member $P_2$. The overlapping edge portions of the sheets 1 and 2, and the cure tape 5 are heated under pressure. The upper press member $P_1$ has a flat pressing surface 7, and the flat cushiony material 6 on the lower press member $P_2$ defines a flat pressing surface 8, too. The two pressing surfaces 7 and 8 are in parallel to each other. Unless the pressing surfaces are in parallel to each other, the molten cure tape does not flow uniformly, but an acutely stepped joint results. The pressing surfaces 7 and 8 must be in parallel to each other, though they may be curved instead of being flat.

Figure 6:
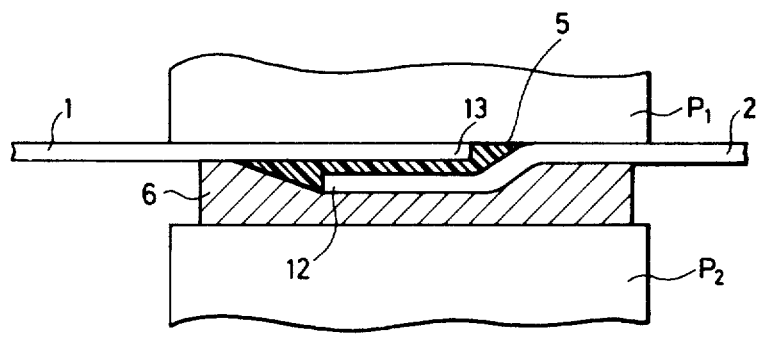
FIG. 6 is a side elevational view showing the two narrow waterproof sheets having their overlapping edge portions heated under pressure in accordance with the method of this invention.
Figure 7:
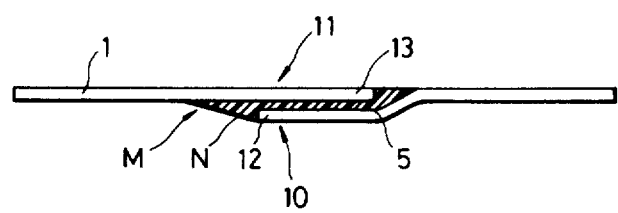
FIG. 7 is a side elevational view showing a joined formed between the waterproof sheets according to the method of this invention.

The overlapping portions of the sheets 1 and 2 are heated under pressure as shown in FIG. 6. The cushiony material, or rubber cushion 6 on the lower press member $P_2$ is deformed to define a gently curved concavity in accordance with the distribution of pressure thereon. The molten cure tape 5 flows out transversely beyond the edges 12 and 13 of the sheets, whereby the two sheets 1 and 2 are joined together with a gently curved joint as shown in FIG. 7. The joint has a gently curved lower surface 10, and a flat upper surface 11 as shown in FIG. 7. The gently curved lower surface 10 is formed by the molten cure tape 5 flowing out transversely beyond the edge 12 of the sheet 2 with the aid of the cushiony material 6, and is free from any acutely stepped portion. The upper surface 11 of the joint is flat, since there is no cushiony material on the pressing surface 7 of the upper press member $P_1$. The flat upper surface 11 includes a smaller area defined by the molten cure tape 5 which has flowed out beyond the edge 13 of the sheet 1.

The fluidity of the cure tape depends on its viscosity and thickness, the hardness and thickness of the cushiony material, and the amount of the pressure to be applied for joining the sheets. According to this invention, the cure tape comprises a tape of vulcanizable, but unvulcanized rubber, such as an ethylene-propylene terpolymer (EPT) containing dicyclopentadiene as the third component and having an iodine value of 20, or containing ethylidene norbornene and having an iodine value of 24, isobutylene-isoprene rubber, that is, butyl rubber (IIP), or mixture of EPT and IIR. The cure tape further contains a vulcanizing agent, a vulcanization accelerator and a softening agent, and stearic acid, carbon black, an inorganic filler, zinc oxide, etc. if required.

The cure tape is fluidizable if it has a Mooney viscosity $[ML_{1+5}(100° C.)]$ not exceeding 80, depending on the amount of pressure to be applied, and the nature of the cushiony material 6. In order to obtain a smooth flow of the cure tape in an area M in FIG. 7, however, it is desirable for the cure tape to have a Mooney viscosity of, say, 15 to 45. The cure tape 5 must be greater in thickness than the sheets 1 and 2 to be joined. In order to provide a smooth flow, it should be about 1.1 to 2.0 times greater in thickness than the sheets 1 and 2. The use of a thinner cure tape would result in formation of a stepped portion at N in FIG. 7.

In order to obtain a smooth finish on the lower surface of the joint, it is most important to select the appropriate cushiony material 6. Although the appropriate cushiony material 6 depends on the viscosity of the cure tape 5, and the amount of pressure to be applied, it is usually desirable to employ a cushiony material having a lower degree of hardness than the sheets to be joined. Examples of the appropriate material include a sheet of rubber having a hardness of 30° to 70° (JIS), particularly heat resistant IIR or EPT, or a mixture of IIR and EPT, or a nonwoven fabric, or a foam.

The pressure to be applied to the overlapping portions of the sheets 1 and 2, and the cure tape 5 may be of any level unless the cure tape foams. Although it is preferable for the cure tape to have a width which is equal to the overlapping width of the vulcanized or unvulcanized sheets to be joined, it may also be somewhat smaller or larger than the overlapping width.

The waterproof sheets to be joined in accordance with this invention are vulcanized or unvulcanized sheets composed mainly of EPT, IIR, or a mixture of EPT and IIR.

According to the method shown in FIGS. 5 and 6, the cushiony material 6 is simply placed on the lower press member $P_2$, and not secured thereto. It is also possible to dispose the cushiony material 6 above the waterproof sheets to be joined. If in this case, the cushiony material 6 is secured to the upper press member $P_1$, however, the exchange of the cushiony material 6 is a very troublesome job. If the cushiony material 6 is positioned below the sheets to be joined, it does not need to be secured to the lower press member $P_2$ by bolts, or the like, but can be changed very easily when required. In either event, however, it is possible to obtain a smoothly finished joint as shown in FIG. 7.

It is conceivable to employ two pieces of cushiony material on the opposite sides, respectively, of the sheets to be joined. This method is not recommendable, since it has a number of disadvantages. A greater amount of pressure has to be applied. The low thermal conductivity of the cushiony material brings about a low thermal efficiency. A greater amount of work is required for changing the cushiony material.

According to this invention, the overlapping portions of the sheets to be joined, and the cure tape disposed therebetween are heated at a temperature of 140° C. to 160° C. under a pressure of 3 to 4 kg/cm² for 5 to 15 minutes.

Figure 8:
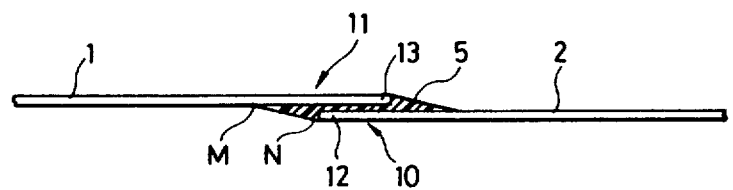
FIGS. 8 and 9 are side elevational views showing modified forms of joints formed in waterproof sheets according to this invention.
Figure 9:
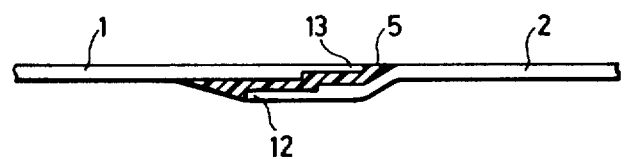

Referring now to FIGS. 8 and 9, there are shown modified forms of the joint in the waterproof sheets. The joint shown in FIG. 8 is obtained by the cushiony material disposed both above and below the waterproof sheets to be joined. The cure tape 5 projects to an equal extent from both of the ends 12 and 13 of the waterproof sheets 1 and 2, and defines the upper and lower surfaces 11 and 10 of the joint which are both gently curved, but free from any acute corner. The joint shown in FIG. 9 is identical to that shown in FIG. 7, except that the overlapping edge portions of the waterproof sheets 1 and 2 are both of the stepped configuration.

According to the method of this invention, it is possible to join waterproof sheets without forming any acutely stepped portion therebetween, form a joint of improved strength therebetween, and construct a waterproof sheet assembly more easily and efficiently at the site of construction.

Figure 10:
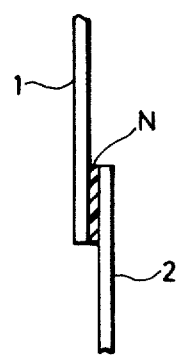
FIG. 10 is a side elevational view showing a testpiece prepared for a shearing strength test by joining a pair of narrow waterproof sheets according to the known method.

A joint having a clearance N therein was formed by a method known in the art as shown in FIG. 10, and tested for shearing strength. It was broken earlier than the sheets per se, and found lower in strength than the sheets. This was due to the localized concentration of stress in the clearance N. No such concentration of stress was, however, observed on the joint formed according to this invention, since it was smooth, and free from any acutely stepped portion. The results of joint efficiency tests also indicated that the joint formed according to this invention was comparable in strength to the sheets per se. The joint was not broken, but it was the sheets that were broken.

The invention will now be described with reference to examples.

EXAMPLE 1

A joint was formed from the following materials under the following conditions.

Sheets to be joined: Vulcanized sheets of a mixture of ethylene-propylene terpolymer and butyl rubber in a ratio by weight of 7:3, each having a thickness of 1.5 mm, and having an overlapping width of 20 mm.

Cure tape:

| Composition (parts by weight) | |
|---|---|
| EPT containing dicyclopentadiene as the third component, and having an iodine value of 20 | 70 |
| IIR | 30 |
| ZnO | 5 |
| SRF carbon | 40 |
| Escoretz (product of Esso Chemical) | 15 |
| Paraffinic process oil (product of Maruzen Petroleum) | 20 |
| Sulfur | 1.5 |
| Dipentamethylenethiuram tetrasulfide | 5.5 |

Mooney viscosity [$ML_{1+5}(100°\ C.)$]: 25

This unvulcanized rubber composition was formed into a sheet having a thickness of 2.0 mm and a width of 20 mm, and disposed between the vulcanized sheets to be joined.

Cushiony material: A 7.0 mm thick sheet of butyl rubber having a hardness of 55° (JIS).

Pressure: 3.5 kg/cm$^2$.

Vulcanizing conditions: At 158° C. for 10 minutes.

The following results were obtained:

Overlapping joint thickness: 3.7 mm

Extended cure tape width: 50 mm

Joint efficiency: The joint was not broken, but it was the sheets that were broken.

Figure 1:
FIG. 1 is a side elevational view of a pair of narrow sheets joined together by a method known in the art.
Figure 2:
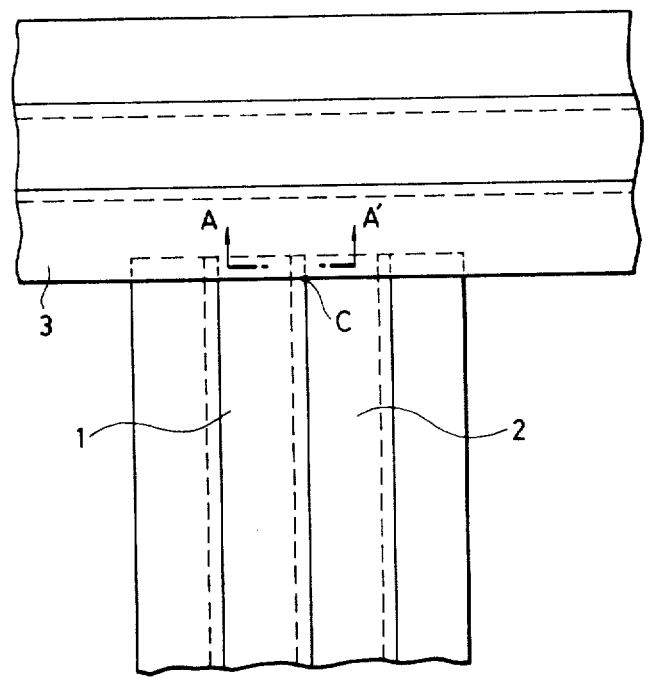
FIG. 2 is a top plan view illustrating a pair of sheets of greater width obtained by the method shown in FIG. 1, and joined together.
Figure 3:
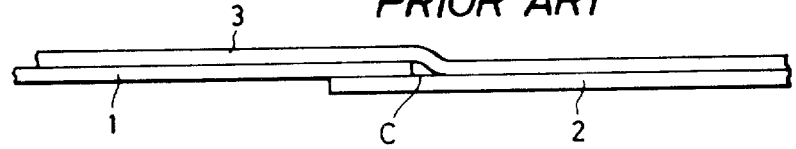
FIG. 3 is a sectional view taken along the line A—A' of FIG. 2.
Figure 4:
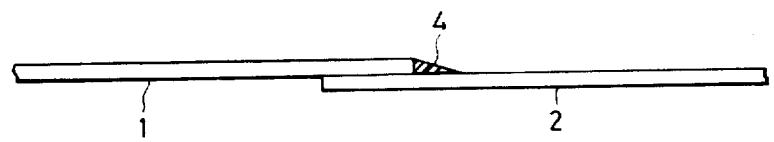
FIG. 4 is a side elevational view of the two narrow sheets joined together by the known method, and having a sealing material to their joint.

Leak tests: The joint formed as shown in FIG. 2 was tested for water leakage in the absence of any sealing material therein. The tests were conducted at a water pressure of 1.0 kg/cm$^2$ for eight hours, and 0.4 kg/cm$^2$ for eight days. No leakage occurred in either case.

It has, thus, been found that the joints formed according to this invention are entirely leak-free without the aid of any sealing material, or unvulcanized tape, or the like.

EXAMPLE 2

A pair of unvulcanized sheets each having a thickness of 1.5 mm, a width of 1.2 m and a length of about 8 m were overlapped along their adjoining edge portions, and a cure tape was disposed between their overlapping edge portions. They were placed on a molding table, and pressure was applied to the overlapping edge portions by a hand roll, whereby the sheets were joined together to form an unvulcanized sheet of wide width. This sheet was wound about a drum having a width of about 8 m. When it was wound on the drum, a canvas called a "vulcanizing liner" was wound together to separate layers of the unvulcanized sheet and prevent their adhesion to one another. This drum was placed in a vulcanizer, and steam vulcanization was carried out for a period of 60 minutes at a pressure of 5 kg/cm$^2$. The joint, and simultaneously the sheet per se were, thus, vulcanized, whereby a waterproof sheet of wide width was obtained. The joint was tested for shearing strength. It was not broken, but it was the sheet per se that was broken, as had been the case with the joint between the vulcanized sheets.

In view of the foregoing, according to the present invention, water leakage at the joint portion of the sheets can be prevented, and the joint portion provides sufficient mechanical strength. Therefore, sheet installation workability becomes remarkably improved.

While the invention has been described in detail and with reference to specific embodiments thereof, it will be apparent to one skilled in the art that various changes and modifications can be made therein without departing from the spirit and scope of the invention.

What is claimed is:

1. A method for joining edges of two sheets together, comprising: disposing a cure tape, which will flow under heat and pressure and is heat curable, between overlapping edge portions of the sheets to be joined, said tape having a width which is substantially equal to that of said overlapping edge portions, positioning said edge portions with said cure tape between pressing members with a resilient cushion between one of said sheets and one of said members, applying heat and pressure to said sheets and the interposed cure tape causing said cure tape to flow, thereby resulting a gently curved joint between said two sheets free from any acutely stepped portion, said cushion being deformed when said pressure is applied so as to form a shaping cavity for the joint therein.

2. A method as set forth in claim 1, wherein said resilient cushion is positioned under said sheets.

3. A method as set forth in claim 2, wherein said heating under pressure is carried out by a pair of vertically spaced apart press members of which the upper defines an upper flat pressing surface, said cushiony material being flat and carried on the lower of said press members, and defining a lower flat pressing surface which is in parallel to said upper pressing surface, said sheets to be joined being heated under pressure between said upper and lower pressing surfaces.

4. A method as set forth in claim 1, 2 or 3, wherein said piece of resilient cushion is a sheet of rubber.

5. A method as set forth in claim 4, wherein said sheet of rubber comprises butyl rubber having a hardness of 30° to 70° (JIS).

6. A method as set forth in claim 1, wherein said cure tape comprises an unvulcanized sheet of a vulcanizable rubber composition consisting mainly of a rubbery polymer selected from the group consisting of an ethylene-propylene terpolymer, butyl rubber, and a mixture of an ethylene-propylene terpolymer and butyl rubber, said composition having a Mooney viscosity [$ML_{1+5}(100°$ C.)] of 15 to 45.

7. A method as set forth in claim 1, wherein said cure tape is 1.1 to 2.0 times greater in thickness than said sheets to be joined.

8. A method as set forth in claim 1, wherein each of said sheets to be joined is a sheet of vulcanized rubber selected from the group consisting of an ethylene-propylene terpolymer, butyl rubber, and a mixture of an ethylene-propylene terpolymer and butyl rubber.

* * * * *